Aug. 18, 1942.　　W. G. McNEILL ET AL　　2,293,069
GUN MOUNT ADAPTER
Filed Nov. 14, 1939　　5 Sheets-Sheet 5
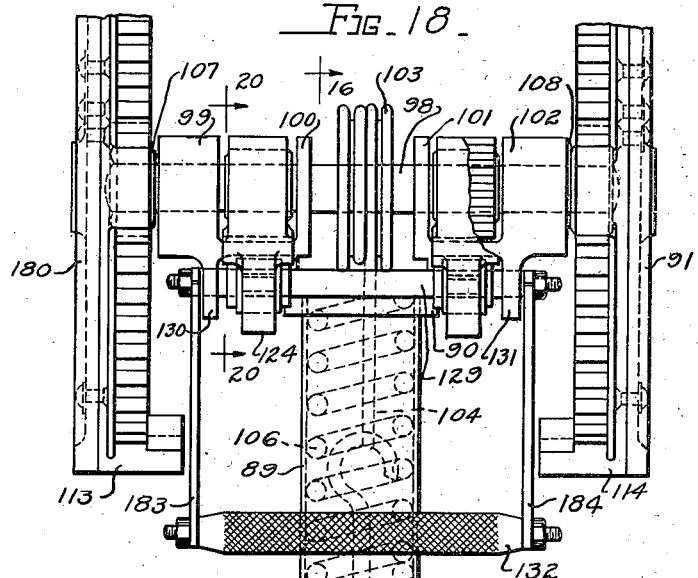
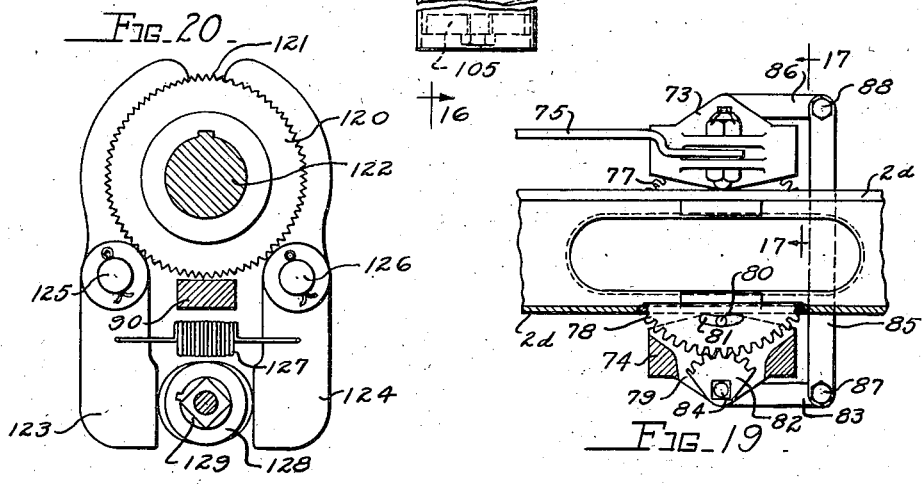
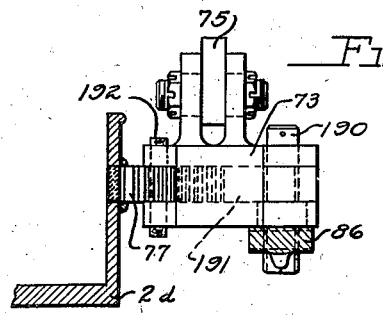
INVENTORS
IRWIN G. BOEHM
WALTER G. McNEILL
BY
ATTORNEYS Patented Aug. 18, 1942

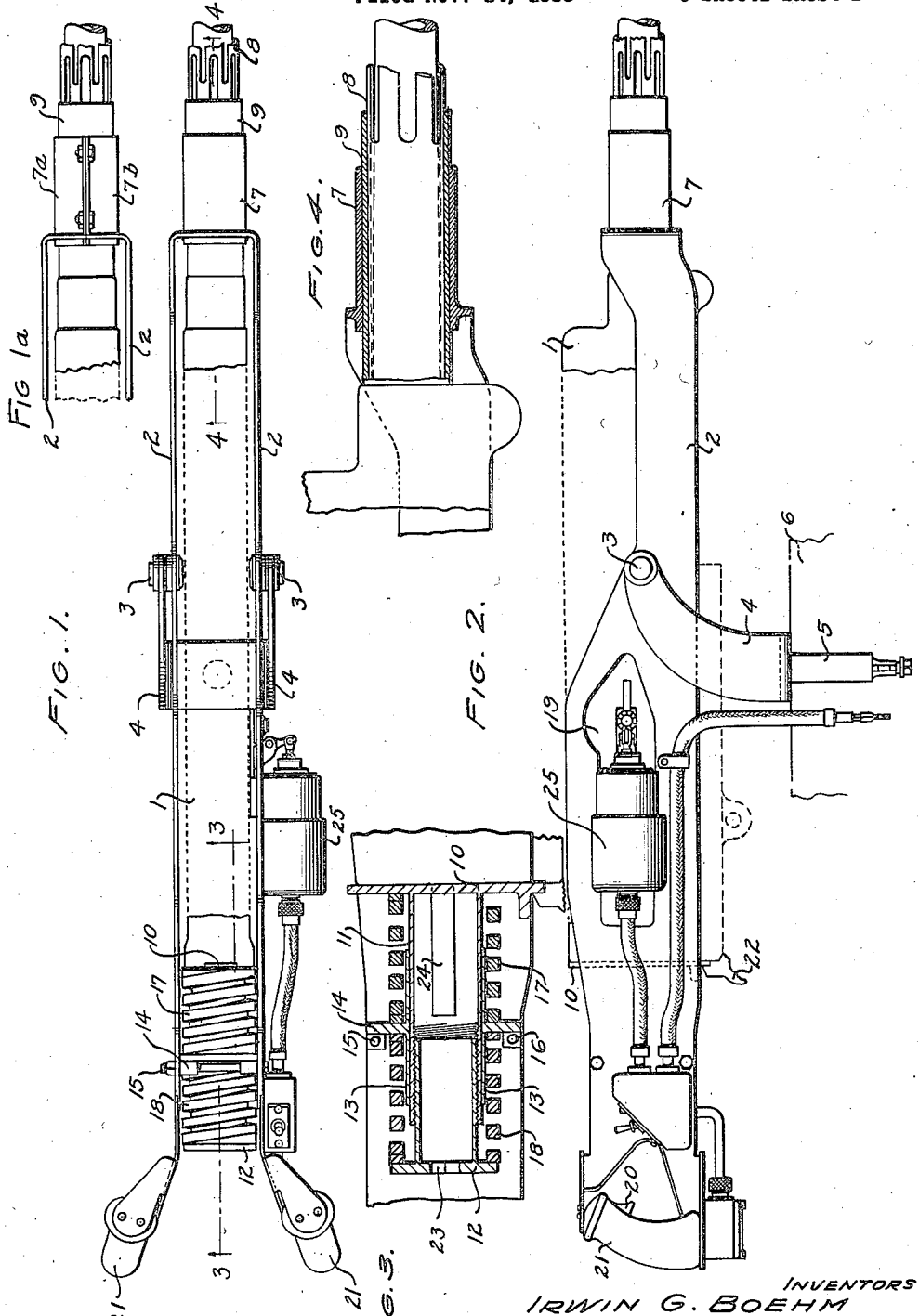

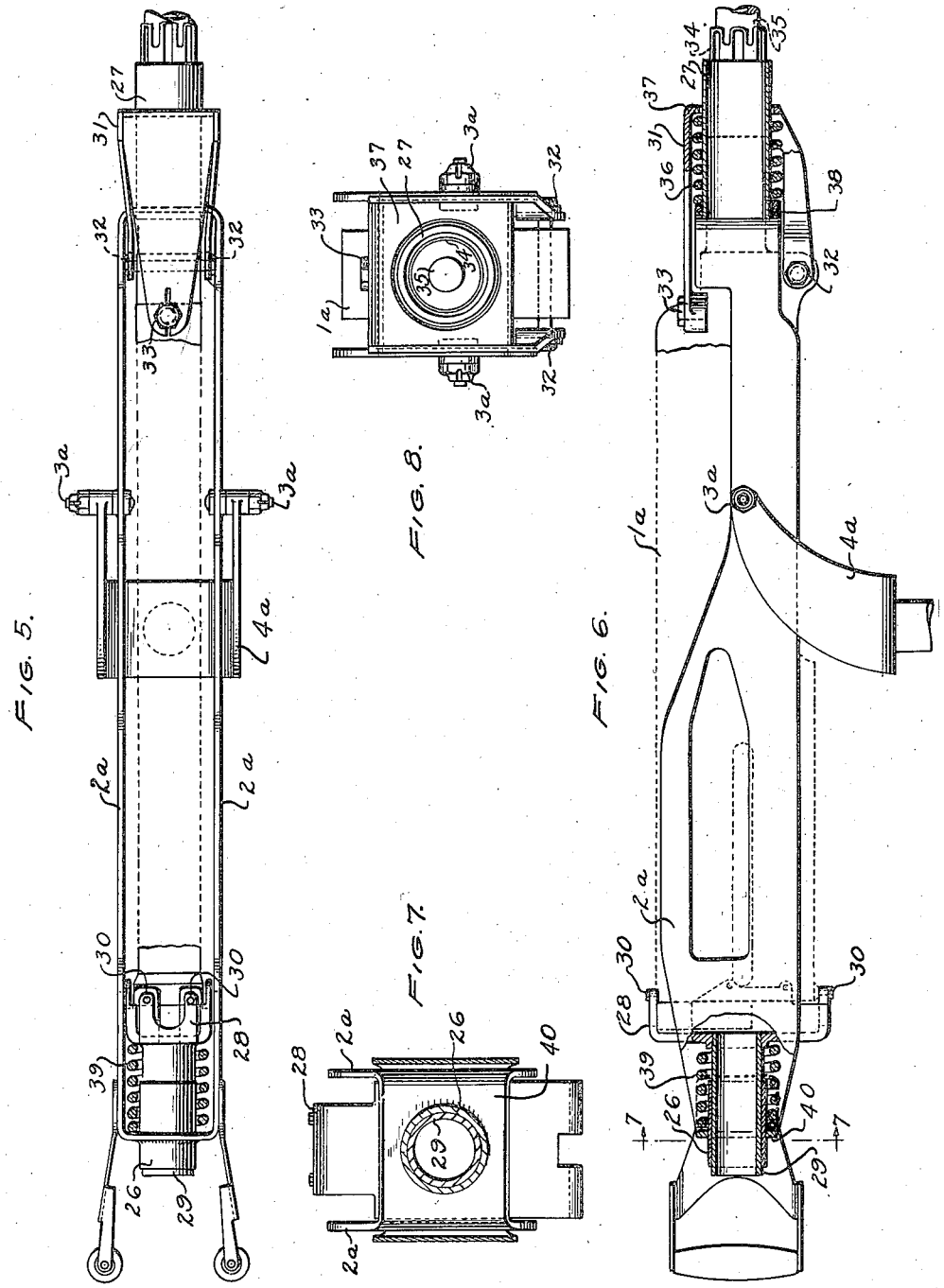

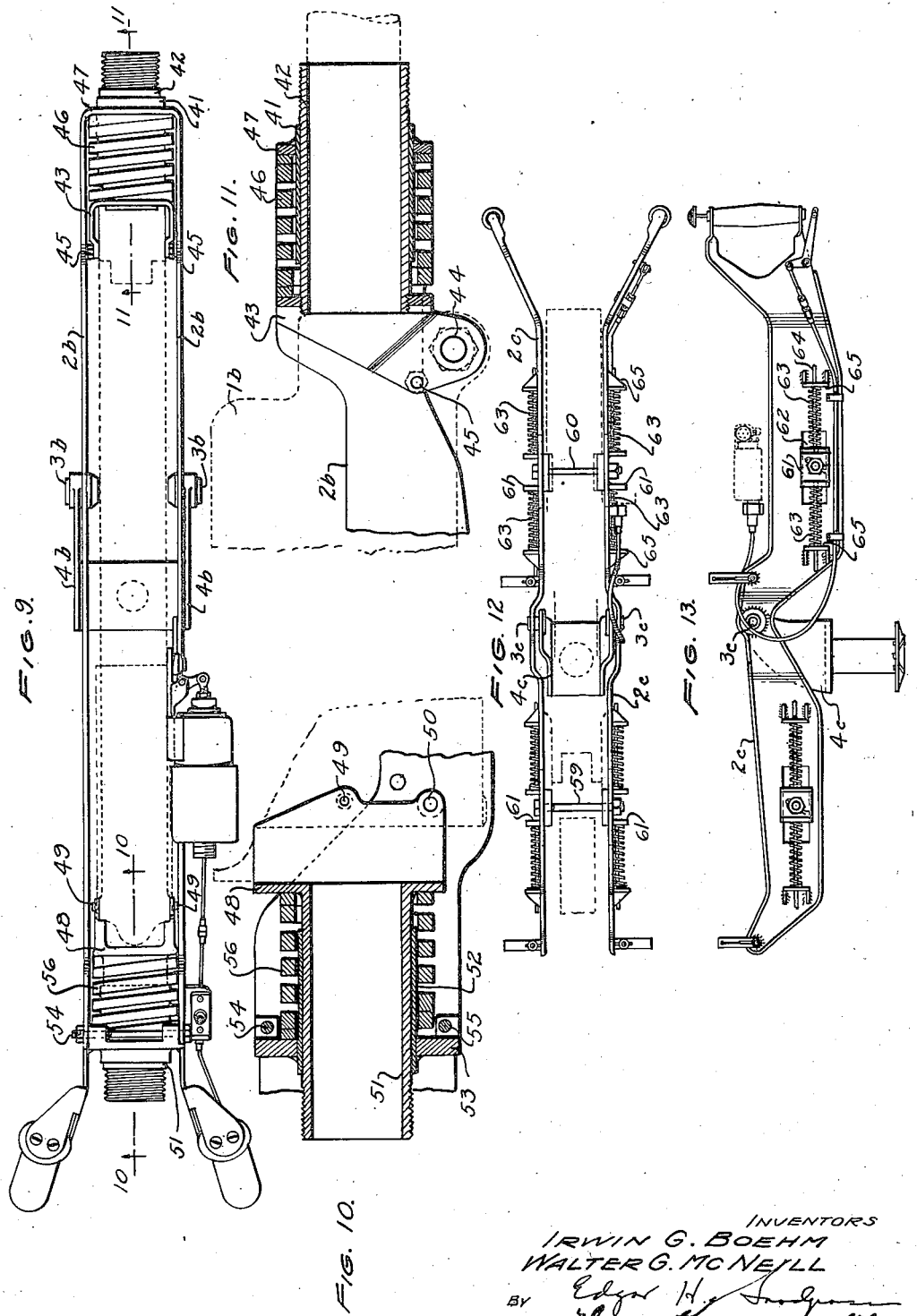

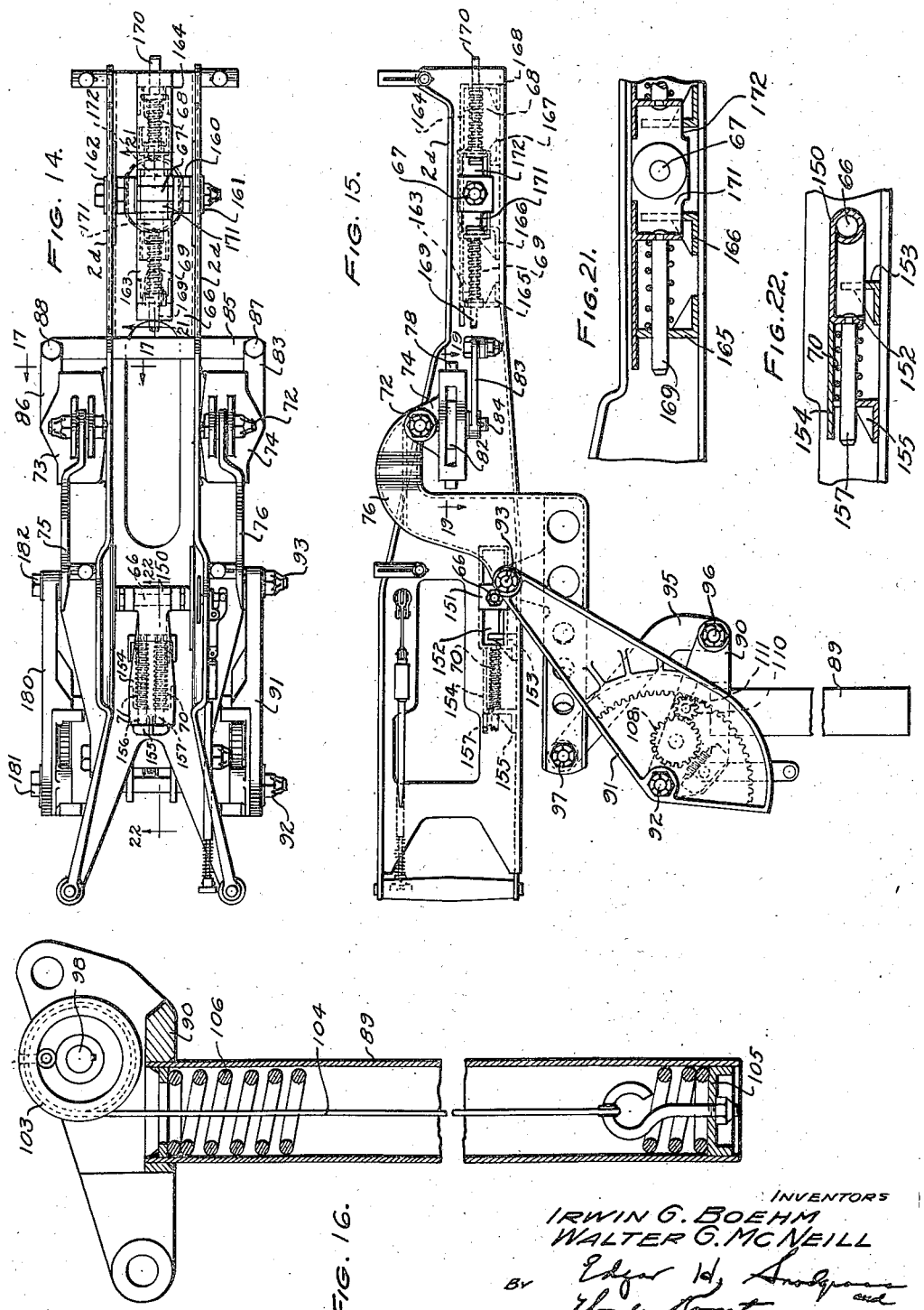

2,293,069

UNITED STATES PATENT OFFICE 2,293,069

GUN MOUNT ADAPTER

Walter G. McNeill and Irwin G. Boehm,
Dayton, Ohio

Application November 14, 1939, Serial No. 304,440

8 Claims. (Cl. 89—44)

(Granted under the act of March 3, 1883, as
amended April 30, 1928; 370 O. G. 757)

The invention described herein may be manufactured and used by or for the Government for governmental purposes, without the payment to us of any royalty thereon.

The subject of this invention is a cradle in which a rapid firing automatic machine gun may be floatingly mounted. The invention is specifically adapted to be used in connection with a 50 caliber Browning aircraft machine gun, model of 1921 or the M2 model. The invention is also adapted to be used with the 30 caliber Browning aircraft machine gun, although it is to be understood that the invention is broadly applicable.

It is well established that a rapid firing machine gun, of the aircraft type mounted to be manipulated and trained by hand, is difficult if not impossible to hold in the aimed position during firing, the oscillations and vibrations of the gun being such that it is generally only possible after one or two shots to fire in the general direction of the target.

An object of this invention is to provide novel recoil and counterrecoil absorbing means adapted and arranged to control the oscillations and vibrations of the gun during firing to such an extent that the gun may be maneuvered by hand and accurately fired from a yoke mount of the type commonly used for mounting machine guns in airplanes.

It is another object of this invention to provide an improved cradle in which the gun may be mounted for small amounts of training movement independent of the cradle.

It is still another object of this invention to provide a spring actuated mechanism for returning the cradle and gun to normal position from an external downward trained position and mechanism for holding the gun in a selected position.

In the drawings:

Figure 1 is a top plan view showing the machine gun in a cradle mount constructed in accordance with the teaching of the invention in which the recoil and counterrecoil absorbing means is arranged between the rear of the gun and the cradle.

Figure 1a shows a modification of the front of the cradle in which the bearing sleeve is split for convenience of assembly.

Figure 2 is a side elevational view of the device as shown in Figure 1.

Figure 3 is a cross-section along the lines 3—3 of Figure 1 showing the vibration absorbing mechanism in detail.

Figure 4 is a cross-section along the lines 4—4 of Figure 1.

Figure 5 is a second embodiment of the invention in which recoil springs only are mounted at the front and rear of the gun, the counterrecoil springs being omitted.

Figure 6 is a side elevational view of Figure 5.

Figure 7 is a cross-section along the lines 7—7 of Figure 6.

Figure 8 is a front elevational view of the mount shown in Figure 5.

Figure 9 is a top plan view of a third embodiment of the invention in which the recoil spring is mounted between the rear of the gun and the cradle and the counterrecoil spring is mounted between the front of the gun and the cradle.

Figure 10 is a cross-sectional view along the lines 10—10 of Figure 9.

Figure 11 is a cross-sectional view along the lines 11—11 of Figure 9.

Figure 12 is a top plan view of still another embodiment of the invention.

Figure 13 is a side elevational view of Figure 12.

Figure 14 is a top plan view of a fourth embodiment of the invention using three recoil and a single counterrecoil spring.

Figure 15 is a side elevational view of the device in Figure 14.

Figure 16 is a sectional view along the line 16—16 of Figure 18.

Figure 17 is a cross-sectional view taken along the lines 17—17 of Figures 14 and 19.

Figure 18 is an end elevational view of Figure 15.

Figure 19 is a cross-sectional view taken along lines 19—19 of Figure 15.

Figure 20 is a cross-sectional view taken along lines 20—20 of Figure 18.

Fig. 21 is a cross-sectional view along the lines 21—21 of Fig. 14.

Fig. 22 is a cross-sectional view along the lines 22—22 of Fig. 14.

Referring to the drawings in detail and particularly to the preferred embodiment of the invention illustrated in Figures 1 through 4, I represents a rapid firing machine gun of the Browning aircraft type floatingly mounted in a cradle formed of side plates 2 mounted on trunnions 3 to pivot about a horizontal axis. Trunnions 3 are carried by yoke 4, having a portion 5 adapted to fit in a suitable vertical bearing in support 6. At the front end of the cradle and integral with side plates 2 is a bearing sleeve 7 in which the front end of the gun is mounted for sliding movement. The bearing may be made in any suitable manner and for convenience of assembly may be made, as shown in Figure 1a, of two halves, 7a and 7b, bolted together. Each half is integral with a side plate 2. To prevent undesirable wear on the barrel cooling sleeve 8, a bearing 9 may be fastened to the cooling sleeve to slide in bearing sleeve 7.

The standard back plate of the machine gun is, in this embodiment, replaced with a special back plate 10 having an extension 11 into which is screw threaded a flanged plug 12. The back plate extension 11 is slidably mounted in sleeve 13 integral with plate 14, which in turn is fastened by bolts 15 and 16 to side plates 2. A recoil spring 17 is placed between the back plate 10 of the gun and the bearing plate 14 and a counter recoil spring 18 is placed between the flange of plug 12 and bearing plate 14.

The Browning 50 caliber aircraft gun, for which this mount is particularly adapted, has a trunnion reaction of approximately nine thousand pounds. In order to effectively absorb an amount of this reaction which will permit manual handling of the gun on a trunnion support during periods of sustained firing, it is necessary to select a recoil absorbing means which will absorb the greatest possible portion of the trunnion reaction and at least partially return to normal position in the interval of time between the firing of successive shots. In the preferred embodiment of the invention, springs are used to absorb the recoil and counterrecoil forces. In order to properly function, the spring must be capable of absorbing the recoil energy without acquiring a "set" under repeated operation. A spring could be selected, when firing single shots, which would absorb practically all the recoil energy and transmit a relatively small force to the cradle. The time required for absorbing practically all the recoil energy is greater than if part of the recoil energy is absorbed and part is transmitted to the cradle support. A stiff spring will absorb less and transmit more of the recoil energy to the cradle support than a "soft" spring. A "soft" spring having a relatively large capacity for absorbing recoil energy will necessarily require more time to receive the load and return to normal position than a stiffer spring. It is desirable to use a spring having the greatest possible energy absorbing characteristics and yet will absorb the energy and return to normal position in the allotted time interval. It has been found that by pre-compressing the recoil and counter-recoil springs, a relatively "soft" spring can be used which will give the desired results of a spring having a high capacity for absorbing energy and yet will absorb and trasmit the energy and return to approximately normal position in the firing interval. Referring to Figures 1 and 3, springs 17 and 18 are compressed, in the case of a 50 caliber machine gun, approximately three-quarters of an inch each by screwing in plug 12 until springs 17 and 18 are pre-loaded approximately four hundred and eighty pounds. For a 30 caliber gun, the amount of pre-compression may be determined by trial until the desired result is obtained or it may be determined by measuring the recoil of a floatingly mounted gun of a given caliber and pre-loading the springs for that given caliber by an amount equal to the measured recoil.

Upon firing, the gun recoils approximately $6/10''$ for the first shot and returns approximately $3/10''$ before the next shot is fired. Upon firing the second shot, the gun recoils approximately $3/10''$ and returns the same amount. The movement for continuous firing is then approximately $3/10''$ in each direction. There is comparatively little jar transmitted to the operator through the training grips compared to apparatus not using the vibration absorbing means. The maneuverability of the gun as well as the accuracy of fire are materially improved.

Again referring to Figures 1 to 4 of the drawings, the back plate assembly comprising the back plate 10, extension 11, plug 12, bearing sleeve 13 and 14 and springs 17 and 18, is removable as a unit by removing bolts 15 and 16, operating conventional back plate latch 22 and sliding the back plate vertically out of locking engagement with the machine gun in a well-known manner. This arrangement permits ready disassembly and allows the adjusted pre-compression setting on the springs to be retained. An opening 23 in plug 12 permits access to conventional buffer 24 for adjustment thereof. Suitable openings 19 are provided in the side plates 2 to permit connection of the operating means for the firing mechanism. The firing mechanism operating means, illustrated in Figure 1, as a sear operating solenoid 25 controlled by a trigger switch 20. It is obvious that a suitable hand operated linkage system may be used to operate the sear mechanism of the gun. The gun is maneuvered and pointed by means of hand grips 21 integral with the side plates 2. In this construction, the hand grips are located farther to the rear than ordinarily, resulting in an increased leverage which facilitates handling of the gun. The recoil and counterrecoil springs are mounted coaxial with the gun, or in other words the center line of the springs is coincidental with a line longitudinal of the gun and through its center of gravity which may or may not lie on the center line of the barrel of the gun.

Second embodiment

In the embodiment shown in Figures 5 through 8, the cradle is similar to the cradle shown in Figures 1 through 4, and comprises side plates 2a pivoted to yoke 4a by means of trunnions 3a. The cradle is provided with bearings 26 and 27 integral therewith for slidably receiving the gun 1a. Bracket 28 suitably bolted to the rear of the gun at 30 has integral therewith extension member 29 slidably received in bearing 26. Bearing 27 slidably receives the front portion of the gun, the bearing being in this instance the conventional barrel cooling sleeve 34 in which the recoiling barrel reciprocates during operation of the gun. It is to be understood that a bearing could be fastened to the cooling sleeve 34 to slide in bearing sleeve 27 if desired. Bracket 31 is suitably bolted to the gun at 32 and 33 and receives recoil spring 36 between end 37 of the bracket and projection 38 on the cradle. A second recoil spring 39 is received between bracket 28 and rim 40 on the end of the cradle. In this embodiment no counterrecoil springs are provided. Springs 36 and 39 are suitably precompressed, for instance, by pressing bracket 31 in place against the action of the springs prior to bolting it to the gun. The tension in the springs may be suitably adjusted in any well-known manner, such as for example, by placing spacer elements such as washers or the like, between the springs and the brackets. By using two recoil absorbing springs, each absorbing approximately half of the recoiling force, a softer spring can be used than in the embodiment in Figures 1 through 4.

Third embodiment

In the embodiment of the invention shown in Figures 9 through 11, side plates 2b are mounted on yoke 4b by trunnion connections 3b. United with the front end of the cradle is bearing sleeve 41 for slidably receiving bearing 42 fastened to gun 1b by means of bracket 43, which in turn is bolted to the gun at 44 and 45. A counter recoil spring 46 is received between bracket 43 and end 47 of cradle 2b. An extension bracket 48 is suitably fastened to the rear of the gun at 49 and 50 and has integral therewith extension 51 slidably received in bearing 52 carried by flange 53 which in turn is bolted to side plates 2b by bolts 54 and 55. Recoil spring 56 is received between bracket 48 and flange 53. Springs 46 and 56 are precompressed a predetermined amount in assembled condition in Figure 9 by pressing in flange 53 to line up the openings in the flange and the side plates and passing bolts 54 and 55 therethrough. The tension in the springs may be adjusted in any well-known manner, such as for example, by placing spacer elements such as washers or the like, between the springs and the brackets. By having the counterrecoil spring between the front end of the gun and the cradle, the rear of the cradle may be shortened, leaving more room in the gunner's compartment for the gunner.

Fourth embodiment

In the embodiment illustrated in Figures 12 and 13, the side plates 2c are mounted on yoke 4c by means of trunnion connections 3c. Bolts 59 and 60, spaced to engage conventional fastening lugs (not shown) on the machine gun for mounting the same, are each floatingly mounted in side plates 2c by means of brackets 61. Since the brackets are identical, only one will be described. Bracket 61 is slidably received in an opening 62 in side plate 2c. Rods 64, integrally united with bracket 61 are slidably received in lugs 65 integral with side plates 2c. Opposed precompressed springs 63 surround rods 64 and abut bracket 61 and lugs 65. The tension in the springs may be adjusted in any well-known manner, such as for example, placing spacer elements such as washers or the like between the springs and the brackets or lugs. While the lugs 65 are shown as being welded to the side plates, it is to be understood that they may be fastened thereto by means of rivets, bolts or the like. This embodiment of the invention is a convenient one for readily attaching and detaching the gun since bolts 59 and 60 are spaced to pass through the conventional fastening lugs on the machine gun. Also this cradle is somewhat shorter than any one of the prior three embodiments.

Fifth embodiment

The embodiment of the cradle shown in Figures 14 through 20 is substantially the same as in Figures 12 and 13, except that a single counter-recoil spring 68 is used in conjunction with a plurality of recoil springs 69, 70 and 71.

Figures 14 through 20 also show a cradle and a mount therefor, in which the cradle may be moved independently of the mount. There is further provided spring means for returning the cradle and gun to normal position after having been trained downwardly. The gun is attached to the cradle by bolts 66 and 67 which pass through conventional fastening lugs on the gun.

Bolt 66 passes through member 150 and plate 151, located on the outside of frame 2d. Bolt 66 also passes through another plate (not shown) similar to 151 but located on the opposite side of frame 2d. These plates aid in guiding member 150 in its reciprocatory movement. Projecting from member 150 is a member 152 slidably received in a cutout portion in bracket 153. (See Fig. 22.) Plate-like member 154, integral with members 150 and 152 is slidably supported by bracket 155 and the non-cutaway portions of upper part of bracket 153. Rods 156 and 157 are fixedly received in openings in member 152 and are slidably received in openings in the upstanding leg of brack 155. Buckling of the coil springs is prevented by rods 156 and 157.

Bolt 67 passes through member 160 and guide plates 161 and 162. Plate-like members 163 and 164 project from member 160 and slide upon brackets 165, 166, 167 and 168. Spring-guiding rods 169 and 170 are fixedly received in portions 171 and 172, respectively, which in turn are integral with plates 163 and 164 and member 160. Portions 171 and 172 are slidably received in cut-out portions in supporting brackets 166 and 167. Rods 169 and 170 are slidably supported at their outer ends by being received in openings in brackets 165 and 168. (See Fig. 21.)

The cradle in this embodiment is connected to and suspended from the gun mount by brackets 73 and 74. Because the right and left sides of the mount are identical, only one side will be shown and described in detail. Bracket 74 is pivotally connected to arm 76 of the mount by bolt 72. As shown in Figure 19, gear segments 77 and 78 are welded to side plates 2d. Gear segment 78 is received in a cut-out portion 79 in bracket 74. Relative movement between bracket 74 and segment 78 is controlled by pin 80 carried by bracket 74 received in slot 81 in gear segment 78. Gear segment 82, pivotally carried by bracket 74, meshes with the gear segment 78 to control relative lateral movement of the cradle in the mount. Link 83 is non-rotatably connected to gear segment 82 by the square opening in the gear segment fitting over a square portion on bolt 84. Bolt 84 also serves to rotatably mount gear 82 on bracket 74. The other end of link 83 is pivotally connected to link 85 by bolt 87. Link 86 is pivotally connected at one end to link 85 and at the other end to a bolt 190 identical with bolt 84. Bolt 190 carries a gear segment 191 identical with gear segment 82 which meshes with segment 77. A pin 192 performs the same function as pin 80.

With this above described arrangement, limited lateral movement of the cradle in the mount is permitted, allowing for small amounts of training movement without moving the entire mount.

The gun mount comprises a post 89, a bracket 90 welded thereto, and arms 91 and 180, arm 91 of which is pivotally connected to bracket 90 by bolt 92 and to arm 76 by bolt 93. Arm 180 is connected to bracket 90 by bolt 181 and to arm 75 by bolt 182. A link 95 is pivotally connected to bracket 90 by bolt 96 and to arm 76 by bolt 97. A similar link connects bracket 90 and arm 75. Shaft 98, rotatably mounted in bearing portions 99, 100, 101, and 102 of bracket 90, has keyed thereto a winding drum 103, to which is connected one end of a cable 104. The other end of the cable is connected by means of an eyebolt to a washer 105, which is slidably received in post 89 and constantly urged downwardly by spring 106. Gears 107 and 108 are keyed to shaft 98 to rotate therewith. Shaft 111, to which are fastened at the opposite ends thereof, idler gears of which only gear 110 is shown, is freely rotatably mounted in bracket 90. Gear 110 and its corresponding gear mesh respectively with racks 114 and 113 which in turn are fastened to arms 91 and 180. Vertical downward movement of the gun and cradle about bolts 92 and 181 causes rotation of shaft 98 because racks 113 and 114 rotate gear 110 and its corresponding gear, which in turn cause rotation of gears 107 and 108. Cable 104 is then wound on drum 103 compressing spring 106. The energy stored up in spring 106 returns the gun to normal position when the force urging the gun downwardly is relieved.

In order to hold the gun in a desired trained position, a locking mechanism is provided, which will now be described. Referring to Figures 18 and 20, drum 120 having serrations 121 thereon is keyed to shaft 98. Serrated locking members 123 and 124 are pivotally mounted on bracket 90 by pins 125 and 126 and are urged into non-locking position by spring 127, the ends of which are hooked into members 123 and 124. Cam member 128 fastened to shaft 129, which in turn is pivotally carried by depending portions 130 and 131 on bracket 90, may be rotated by handle 132 connected to shaft 129 by links 183 and 184. Operation of the handle in one direction spreads members 123 and 124 and urges the serrated portions thereof into engagement with the serrated drum 120. Movement of the handle in the opposite direction allows spring 127 to draw the arms together, unlocking the arms from the drum and, consequently, unlocking the shaft to permit further training of the gun. Two of such locking mechanisms are provided, one on each side of drum 103 as shown in Figure 18.

Various modifications may be made in the structure illustrated and described without departing from the spirit and scope of the invention. It is intended to be limited only by the appended claims.

We claim:

1. A back plate assembly for a rapid firing automatic machine gun comprising a back plate, an extension integral with said back plate, abutment means freely slidably mounted on said extension and adapted to be connected to a support, recoil absorbing means mounted on said extension on one side of said abutment means and counterrecoil absorbing means mounted on said extension on the other side of said abutment means, and means for detachably connecting said back plate assembly to said gun whereby it may be separated from the gun as a unit.

2. In a machine gun a back plate assembly adapted to be readily attached to and separated from the machine gun as a unit, said assembly comprising a back plate, an extension integral with said back plate, a rimmed plug adjustably connected to said extension, a plate freely slidably mounted on said extension, a recoil spring between said plate and said gun, a counterrecoil spring between said plate and the rim of said plug, means for detachably connecting said plate to a gun support, said plug being adjustable to precompress said springs.

3. A gun mount comprising a hollow post member, a bracket integrally united with said post member, carriages pivotally connected to said bracket, a rack carried by each of said carriages, cradle carrying arms pivotally connected to said carriages, a link pivotally connected to said bracket and said arms, a gear system mounted on said bracket to mesh with said rack and be actuated thereby, a drum rotatably mounted on said bracket in operative relation with said gear system, a cable attached to and adapted to be wound upon said drum, a coil spring in said post member, means connected to said cable for engaging said spring to compress said spring upon rotation of said drum as a result of training said gun.

4. A gun mount comprising a pair of arms, a cradle mounted in said arms for vertical and lateral movement, a bracket having means thereon adapted to be received in a support, carriage members pivotally connected to said bracket and to said arms, a link pivotally connected to said arms and said bracket and means carried by said bracket and actuated by movement of said cradle and arms for returning said cradle and arms to a normal position.

5. A device as recited in claim 4 and further comprising means for locking said mount in a selected position.

6. A gun mount as recited in claim 4 and further comprising a shaft, a serrated drum keyed to said shaft, serrated levers pivotally mounted on said bracket, a spring for urging said serrated levers into inoperative position, and a cam member operative to urge said levers into engaging position.

7. A back plate assembly for a rapid firing automatic gun comprising a back plate, an extension integral with said back plate, abutment means freely slidably mounted on said extension and adapted to be connected to a support, a recoil absorbing spring mounted on said extension on one side of said abutment means and a counterrecoil absorbing spring mounted on said extension on the other side of said abutment means, said recoil and counterrecoil springs each having a natural period of vibration greater than the firing period of the gun, said springs being substantially identical and precompressed by such an amount that the resulting period of vibration of the combined gun and springs is so correlated with the firing period of the gun that the gun, when firing continuously, oscillates substantially between maximum recoil position and a point approximately halfway between maximum recoil position and battery position, and means for detachably connecting said back plate assembly to said gun and said abutment means to a support whereby said assembly may be separated from the gun as a unit without disturbing the adjustment of said springs.

8. A device for floatingly mounting a rapid firing automatic gun, comprising a cradle, a gun mounted for limited sliding movement in said cradle, a recoil spring adjacent the rear of the gun and between the gun and the cradle, and a counterrecoil spring adjacent the front of the gun and between the gun and the cradle, said springs being substantially identical and arranged substantially coaxial with the longitudinal axis of the gun, said springs further having a natural period of vibration greater than the firing period of the gun and a relatively large energy absorbing capacity, and being precompressed by such an amount that the resulting period of vibration of the combined gun and springs is so correlated with the firing period of the gun that the gun, when firing continuously, oscillates substantially between maximum recoil position and a point approximately halfway between maximum recoil position and battery position.

WALTER G. McNEILL.
IRWIN GEO. BOEHM.